(12) United States Patent
Guerreiro et al.

(10) Patent No.: US 10,727,926 B2
(45) Date of Patent: Jul. 28, 2020

(54) SYSTEMS AND METHODS FOR ADAPTIVE INITIAL SYNCHRONIZATION BEAM SWEEP

(71) Applicant: Telefonaktiebolaget LM Ericsson (publ), Stockholm (SE)

(72) Inventors: Igor Moaco Guerreiro, Fortaleza (BR); Johan Axnäs, Solna (SE); Robert Baldemair, Solna (SE); Dennis Hui, Sunnyvale, CA (US); Eleftherios Karipidis, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/331,022

(22) PCT Filed: Jul. 28, 2017

(86) PCT No.: PCT/EP2017/069231
§ 371 (c)(1),
(2) Date: Mar. 6, 2019

(87) PCT Pub. No.: WO2018/029017
PCT Pub. Date: Feb. 15, 2018

(65) Prior Publication Data
US 2019/0215049 A1    Jul. 11, 2019

Related U.S. Application Data

(60) Provisional application No. 62/372,441, filed on Aug. 9, 2016.

(51) Int. Cl.
*H04B 7/06* (2006.01)
*H04B 7/0426* (2017.01)

(52) U.S. Cl.
CPC .......... *H04B 7/0695* (2013.01); *H04B 7/043* (2013.01); *H04B 7/0626* (2013.01)

(58) Field of Classification Search
CPC .... H04B 7/043; H04B 7/0626; H04B 7/0695; H04B 7/2125
See application file for complete search history.

(56) References Cited

U.S. PATENT DOCUMENTS

| | | | |
|---|---|---|---|
| 2010/0033374 A1* | 2/2010 | van Rensburg | H01Q 1/246 342/368 |
| 2013/0059619 A1 | 3/2013 | Kim et al. | |

(Continued)

FOREIGN PATENT DOCUMENTS

WO    2016 043502 A1    3/2016

OTHER PUBLICATIONS

International Search Report for International application No. PCT/EP2017/069231—dated Nov. 3, 2017.

*Primary Examiner* — Khanh C Tran
(74) *Attorney, Agent, or Firm* — Baker Botts, LLP

(57) ABSTRACT

According to certain embodiments, a method in a network node is provided for adaptive initial synchronization beam sweep transmission. The method includes transmitting a plurality of initial synchronization beams with at least two different beam sweep cycles. At least one beam sweep cycle is an exhaustive beam sweep cycle and at least one beam sweep cycle is an optimized beam sweep cycle. The exhaustive beam sweep cycle covers all of a serving area of the cell and the optimized beam sweep cycle covers a subset of the serving area.

16 Claims, 11 Drawing Sheets

(56) References Cited

U.S. PATENT DOCUMENTS

| | | | | |
|---|---|---|---|---|
| 2015/0382334 A1* | 12/2015 | El Ayach | .............. | H04W 16/28 |
| | | | | 370/336 |
| 2016/0127919 A1 | 5/2016 | Hui et al. | | |
| 2017/0325260 A1* | 11/2017 | Guo | .................... | H04L 27/2602 |
| 2019/0238270 A1* | 8/2019 | Pan | ....................... | H03M 13/09 |
| 2019/0349830 A1* | 11/2019 | Peisa | ................. | H04W 36/0083 |

* cited by examiner

SYSTEMS AND METHODS FOR ADAPTIVE INITIAL SYNCHRONIZATION BEAM SWEEP

PRIORITY

This nonprovisional application is a U.S. National Stage Filing under 35 U.S.C. § 371 of International Patent Application Serial No. PCT/EP2017/069231 filed 2017 Jul. 28 and entitled "Systems And Methods For Adaptive Initial Synchronization Beam Sweep" which claims priority to U.S. Provisional Patent Application No. 62/372,441 filed Aug. 9, 2016 both of which are hereby incorporated by reference in their entirety.

TECHNICAL FIELD

The present disclosure relates, in general, to wireless communications and, more particularly, systems and methods for systems and methods for adaptive initial synchronization beam sweep.

BACKGROUND

In today's systems, before a wireless device, which may also be called a user equipment (UE), begins communicating with the network, it must detect and decode synchronization signals sent out by access nodes (ANs) within the network. After decoding the network information sent through a received synchronization signal, the device is able to communicate with the corresponding AN to start a random-access procedure. Such synchronization signals are generally sent omnidirectionally by current systems such as, for example, LTE systems operating at below-6 GHz bands. Thus, wherever a UE requires synchronization, such signals may be detectable without requiring multi-antenna (spatial) processing.

However, transmission of synchronization signals enabling initial access of UEs becomes a challenge in scenarios requiring the deployment of antenna arrays with a massive number of antenna elements, possibly both at ANs and UEs, especially in mm-wave bands. Such scenarios are envisioned to be relevant in the next generation. Specifically, for example, such scenarios may be relevant in 5G wireless communication systems. Due to the inherent beam narrowness and severe mm-wave propagation conditions in such systems, energy radiation is concentrated in a very small area during a transmission interval. Thus, the detection of synchronization signals by UEs in such scenarios requires achieving spatial alignment between transmit and receive beam directions.

To achieve spatial alignment between transmit and receive beams, a beam sweep procedure is adopted, where ANs transmit synchronization signals in different beam directions, one at a time, while UEs search for synchronization signals over different beam directions.

SUMMARY

To address the foregoing problems with existing solutions, disclosed is systems and methods for adaptive initial synchronization beam sweep.

According to certain embodiments, a method in a network node is provided for adaptive initial synchronization beam sweep transmission. The method includes transmitting a plurality of initial synchronization beams with at least two different beam sweep cycles. At least one beam sweep cycle is an exhaustive beam sweep cycle and at least one beam sweep cycle is an optimized beam sweep cycle. The exhaustive beam sweep cycle covers all of a serving area of the cell and the optimized beam sweep cycle covers a subset of the serving area.

According to certain embodiments, a network node is provided for adaptive initial synchronization beam sweep transmission. The network node controls a serving area of a cell and includes a memory storing instructions and processing circuitry. The processing circuitry is configured to execute the instructions to cause the processing circuitry to transmit a plurality of initial synchronization beams with at least two different beam sweep cycles. At least one beam sweep cycle is an exhaustive beam sweep cycle, and at least one beam sweep cycle is an optimized beam sweep cycle. The exhaustive beam sweep cycle covers all of a serving area of the cell and the optimized beam sweep cycle covers a subset of the serving area.

According to certain embodiments, a method in a wireless device is provided for adaptive initial synchronization beam sweep reception. The method includes detecting at least one initial synchronization beam that is transmitted using at least one of an exhaustive beam sweep cycle covering a whole serving area of a cell and an optimized beam sweep cycle covering a subset of the whole serving area of the cell. The at least one initial synchronization beam is decoded and synchronization of the wireless device is performed based on the at least one decoded initial synchronization beam.

According to certain embodiments, a wireless device is provided for adaptive initial synchronization beam sweep reception. The wireless device includes a memory storing instructions and processing circuitry. The processing circuitry is configured to execute the instructions to cause the processing circuitry to detect at least one initial synchronization beam transmitted using at least one of an exhaustive beam sweep cycle covering a whole serving area of a cell and an optimized beam sweep cycle covering a subset of the whole serving area of the cell. The at least one initial synchronization beam is decoded and synchronization of the wireless device is performed based on the at least one decoded initial synchronization beam.

According to certain embodiments, a computer program or, a computer program product or a carrier containing a computer program, comprising instructions which, when executed on at least one processor, causes the at least one processor to carry out a method for adaptive initial synchronization beam sweep transmission. The method includes transmitting a plurality of initial synchronization beams with at least two different beam sweep cycles. At least one beam sweep cycle is an exhaustive beam sweep cycle and at least one beam sweep cycle is an optimized beam sweep cycle. The exhaustive beam sweep cycle covers all of a serving area of the cell and the optimized beam sweep cycle covers a subset of the serving area.

Certain embodiments of the present disclosure may provide one or more technical advantages. For example, certain embodiments may combine both exhaustive beam sweep and optimized beam sweep and allow for dynamic readjustment of beam sweep parameters. Another advantage may be that the optimized beam sweep cycles may allow network nodes to rely on up-to-date historical statistics whenever the nodes need to determine new optimized beam sweep parameters. As a result, the disclosed techniques may reduce the misdetection probability of unsynchronized wireless devices. Still another advantage may be that the disclosed techniques decrease scanning delay. Still another technical advantage may be that the set of historical statistics are improved by adding information on scanning delay, which allows network nodes to optimize the beam sweep parameters subject to delay constraints.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Particular embodiments of the present disclosure may provide solutions enabling adaptive initial synchronization beam sweep. Using one approach, ANs can perform an exhaustive beam sweep by transmitting a synchronization signal in every beam direction to fully cover the service area of the AN. Another approach is to optimize some parameters of the beam sweep, such as the beam pattern and the beam power setting. The parameters may be optimized based on historical statistics of UEs provided by the system.

It may be recognized that the exhaustive beam sweep may suffer from energy inefficiency and large scanning delays, because some synchronization signals can be sent over regions where wireless devices are very unlikely to be when seeking for synchronization. An optimized beam sweep emerges as an energy efficient solution that relies on the availability of a set of historical statistics used for optimization purposes. However, such datasets must be suitably updated so that the beam sweep procedure is often optimized. Additionally, latency is still a potential issue even with the use of optimized beam sweep. That is, a wireless device may still wait too long if the spatial characteristics of the wireless device cannot be learned from the available historical statistics.

The methods and techniques described herein combine both exhaustive beam sweep and optimized beam sweep and dynamically readjusts their parameters. A cycle of the exhaustive beam sweep is periodically run among sequences of cycles of the optimized beam sweep. Each cycle of the exhaustive beam sweep is designed so that synchronization signals sent during its duty cycles are detectable everywhere by any unsynchronized wireless device. This way, any wireless device searching for synchronization that fails to detect synchronization signals during an optimized beam sweep cycle can successfully do it during a following exhaustive beam sweep cycle. Additionally, while a wireless device waits for synchronization, the wireless device may count the corresponding scanning delay until the wireless device detects at least one synchronization signal, which generates a time-stamped per-beam received signal quality to the system that is reported eventually. Network nodes operating as access nodes (ANs) may then update the historical statistics and check whether the optimized beam sweep parameters must be readjusted. Alternatively, ANs may readjust the periodicity that the exhaustive beam sweep cycles are run.

Figure 1:
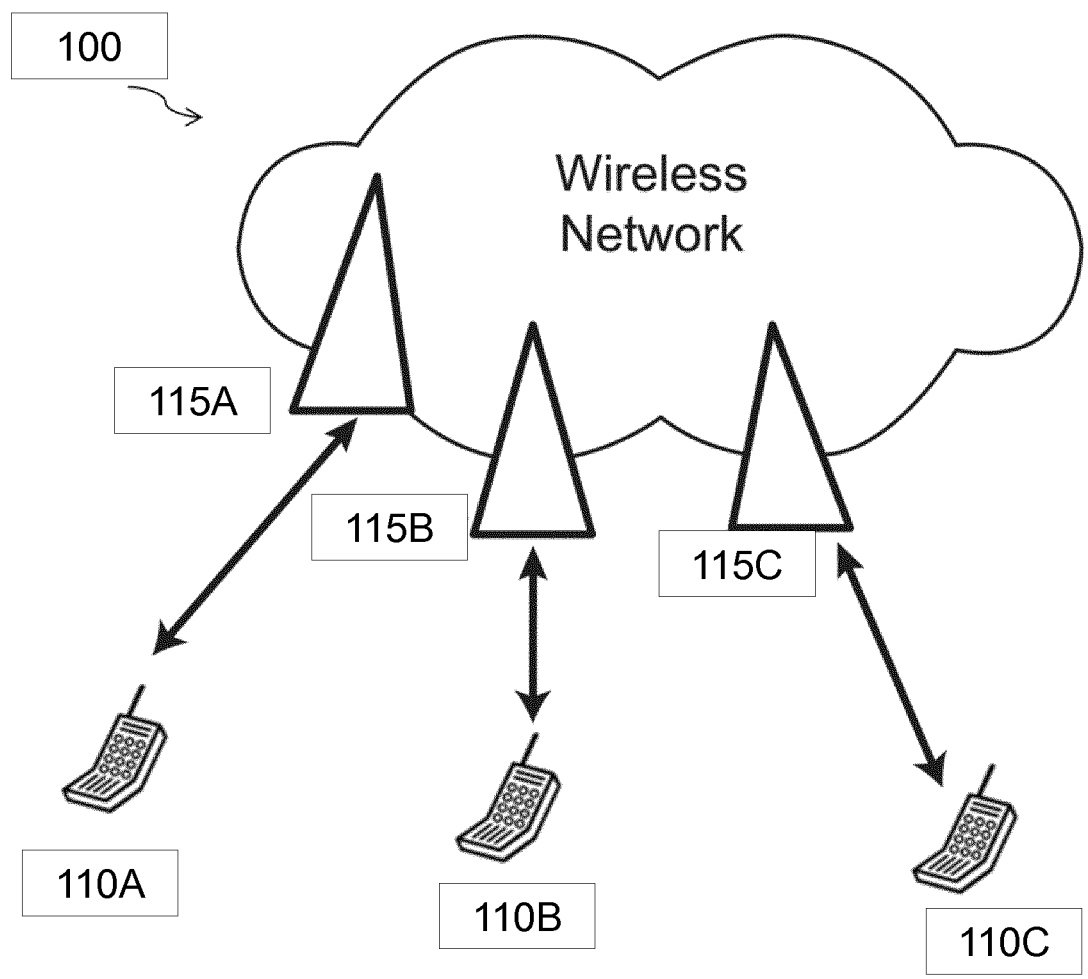
FIG. 1 illustrates an example network for adaptive initial synchronization beam sweep, in accordance with certain embodiments.

Particular embodiments are described in FIGS. 1-11 of the drawings, like numerals being used for like and corresponding parts of the various drawings. FIG. 1 is a block diagram illustrating an embodiment of a network 100 for adaptive initial synchronization beam sweep, in accordance with certain embodiments. Network 100 includes one or more wireless devices 110A-C, which may be interchangeably referred to as wireless devices 110 or UEs 110, and network nodes 115A-C, which may be interchangeably referred to as network nodes 115, eNodeBs 115, or access nodes 115A-C. A wireless device 110 may communicate with network nodes 115 over a wireless interface. For example, wireless device 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, wireless devices 110 may have D2D capability. Thus, wireless devices 110 may be able to receive signals from and/or transmit signals directly to another wireless device 110. For example, wireless device 110A may be able to receive signals from and/or transmit signals to wireless device 110B.

In certain embodiments, network nodes 115 may interface with a radio network controller (not depicted in FIG. 1). The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an internode interface. For example, network nodes 115A and 115B may interface over an X2 interface.

As described above, example embodiments of network 100 may include one or more wireless devices 110, and one or more different types of network nodes capable of communicating (directly or indirectly) with wireless devices 110. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, gNB, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. Example embodiments of network nodes 115 and wireless devices 110 are described in more detail with respect to FIGS. 2 and 3, respectively.

Although FIG. 1 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE-Advanced, LTE-U UMTS, HSPA, GSM, cdma2000, WiMax, WiFi, another suitable radio access technology, or any suitable combination of one or more radio access technologies. 5G, the fifth generation of mobile telecommunications and wireless technology is not yet fully defined but in an advanced draft stage within 3GPP. It includes work on 5G New Radio (NR) Access Technology. LTE terminology is used in this disclosure in a forward looking sense, to include equivalent 5G entities or functionalities although a different term may be specified in 5G. A general description of the agreements on 5G New Radio (NR) Access Technology so far is contained in most recent versions of the 3GPP 38-series Technical Reports.

Although certain embodiments may be described in the context of wireless transmissions in the downlink, the present disclosure contemplates that the various embodiments are equally applicable in the uplink and vice versa.

Figure 2:
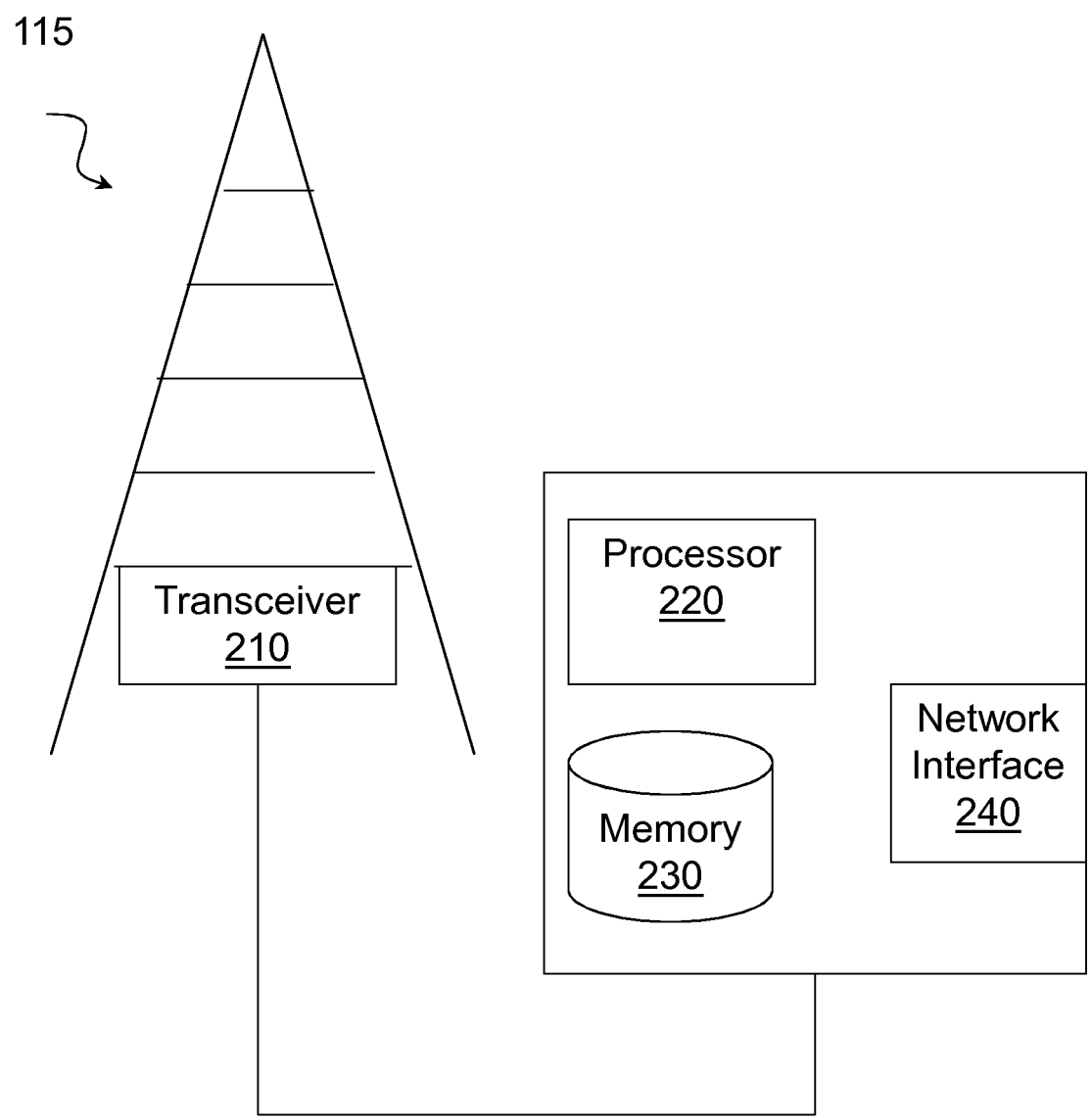
FIG. 2 illustrates an example network node for adaptive initial synchronization beam sweep transmission, in accordance with certain embodiments.

FIG. 2 illustrate an example network node 115 for adaptive initial synchronization beam sweep transmission, according to certain embodiments. As described above, network node 115 may be any type of radio network node or any network node that communicates with a wireless device and/or with another network node. Examples of a network node 115 are provided above.

Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 210, processor 220, memory 230, and network interface 240. In some embodiments, transceiver 210 facilitates transmitting wireless signals to and receiving wireless signals from wireless device 110 (e.g., via an antenna), processor 220 executes instructions to provide some or all of the functionality described above as being provided by a network node 115, memory 230 stores the instructions executed by processor 220, and network interface 240 communicates signals to backend network components, such as a gateway, switch, router, Internet, Public Switched Telephone Network (PSTN), core network nodes or radio network controllers, etc.

In certain embodiments, network node 115 may be capable of using multi-antenna techniques, and may be equipped with multiple antennas and capable of supporting MIMO techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processor 220 may include any suitable combination of hardware and software implemented in one or more modules to execute instructions and manipulate data to perform some or all of the described functions of network node 115. In some embodiments, processor 220 may include, for example, one or more computers, one or more central processing units (CPUs), one or more microprocessors, one or more applications, and/or other logic. In certain embodiments, processor 220 may include or be processing circuitry that is operable to execute instructions, software, or logic to perform the techniques disclosed herein.

Memory 230 is generally operable to store instructions, such as a computer program, software, an application including one or more of logic, rules, algorithms, code, tables, etc. and/or other instructions capable of being executed by a processor. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information.

In some embodiments, network interface 240 is communicatively coupled to processor 220 and may refer to any suitable device operable to receive input for network node 115, send output from network node 115, perform suitable processing of the input or output or both, communicate to other devices, or any combination of the preceding. Network interface 240 may include appropriate hardware (e.g., port, modem, network interface card, etc.) and software, including protocol conversion and data processing capabilities, to communicate through a network.

Other embodiments of network node 115 may include additional components beyond those shown in FIG. 2 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components. Additionally, the terms first and second are provided for example purposes only and may be interchanged.

Figure 3:
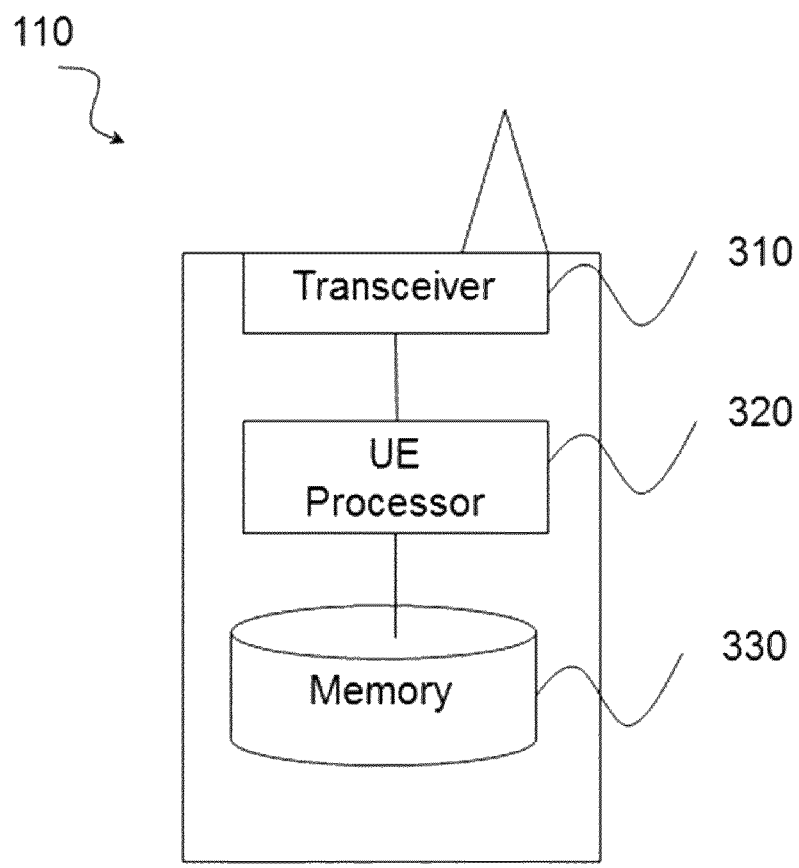
FIG. 3 illustrates an example wireless device for adaptive initial synchronization beam sweep reception, in accordance with certain embodiments.

FIG. 3 illustrates an example wireless device 110 for adaptive initial synchronization beam sweep reception, in accordance with certain embodiments. As depicted, wireless device 110 includes transceiver 310, processor 320, and memory 330. In some embodiments, transceiver 310 facilitates transmitting wireless signals to and receiving wireless signals from network node 115 (e.g., via an antenna), processor 320 executes instructions to provide some or all of the functionality described above as being provided by wireless device 110, and memory 330 stores the instructions executed by processor 320. Examples of a wireless device 110 are provided above.

Processor 320 may include any suitable combination of hardware and software implemented in one or more modules to execute instructions and manipulate data to perform some or all of the described functions of wireless device 110. In some embodiments, processor 320 may include, for example, one or more computers, one or more central processing units (CPUs), one or more microprocessors, one or more applications, and/or other logic. In certain embodiments, processor 320 may include or be processing circuitry that is operable to execute instructions, software, or logic to perform the techniques disclosed herein.

Memory 330 is generally operable to store instructions, such as a computer program, software, an application including one or more of logic, rules, algorithms, code, tables, etc. and/or other instructions capable of being executed by a processor. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 3 that may be responsible for providing certain aspects of the wireless device's functionality, including any of the functionality described above and/or any additional functionality (including any functionality necessary to support the solution described above).

Figure 4:
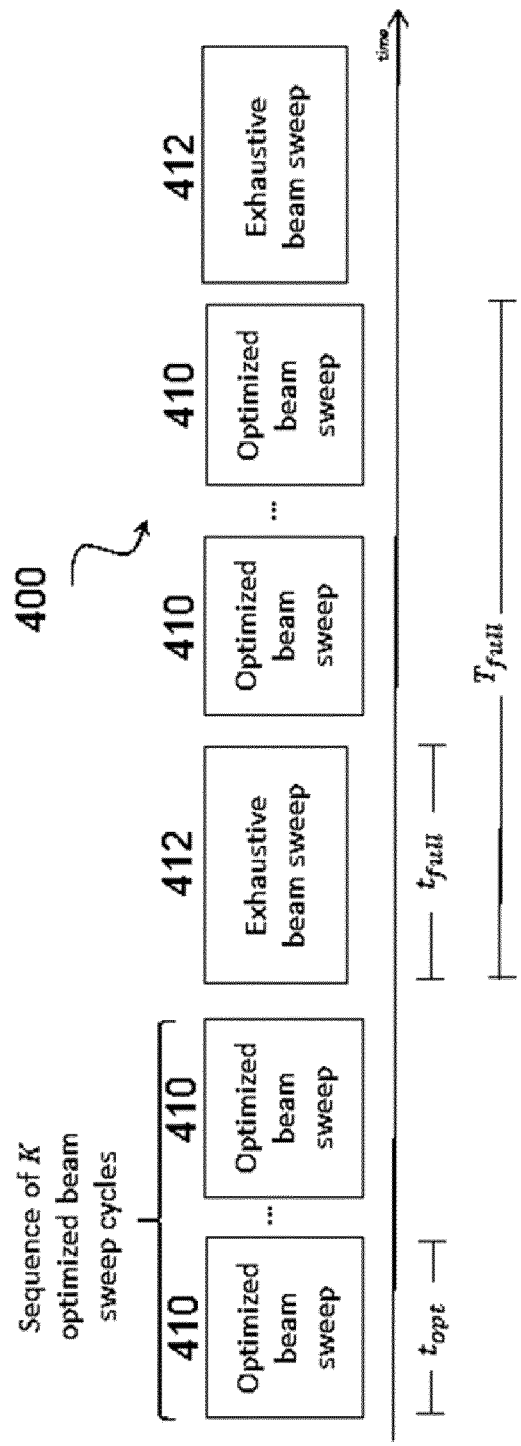
FIG. 4 illustrates an example technique incorporating adaptive initial synchronization beam sweep, in accordance with certain embodiments.

In certain embodiments, network nodes 115 and wireless devices 110 of network 100 may use a technique that incorporates an adaptive beam sweep that includes two different types of beam sweep cycles. FIG. 4 illustrates an exemplary technique incorporating adaptive initial synchronization beam sweep 400, according to certain embodiments. As depicted, the adaptive initial synchronization beam sweep 400 includes both optimized beam sweep cycles 410 and exhaustive beam sweep cycles 412. Exhaustive beam sweep cycles 412 may allow network nodes 115A-C operating as access nodes (ANs) to periodically fully scan their service areas by transmitting a synchronization signal in every beam direction, one at a time. Stated differently, synchronization signals may be transmitted over the whole service area of each cell served by the ANs. Conversely, using optimized beam sweep cycle 410, network nodes 115A-C operating as ANs follow an optimized beam sweep parameter setting based on historical statistics of wireless devices 110A-C. Thus, ANs may perform an optimized beam sweep cycle 410 using beam sweep parameters that are adjusted based on available historical statistics of wireless devices 110A-C.

According to certain embodiments, a beam sweep pattern is a sequence of beams, which is repeated over time. The optimized beam sweep cycle 410 has a beam sweep pattern that includes a shorter sequence of beams compared to the pattern within an exhaustive beam sweep cycle 412, which includes the sequence of all of the beams. In a particular embodiment, sequences of K optimized beam sweep cycles may be run between exhaustive beam sweep cycles. The sequence of an exhaustive beam sweep cycle 412 and K optimized beam sweep cycles 410 may be considered a combined beam sweep pattern. According to certain embodiments, each optimized beam sweep cycle lasts a duration of $t_{opt}$ units of time. The optimized beam sweep cycle duration depends on its beam sweep pattern, and K K depends on $t_{opt}$. In particular embodiments, the duration $t_{opt}$ may be shorter or longer depending on how many beams is used to form the beam sweep pattern with an optimized beam sweep cycle 410. For example, if $t_{opt}$ is decreased, then K can be increased as more optimized beam sweep cycles 410 fit in the interval between two exhaustive beam sweep cycles 412. Conversely, if $t_{opt}$ is increased, then K can be decreased as fewer optimized beam sweep cycles 410 may fit in the interval between two exhaustive beam cycles 412.

In a particular embodiment, an exhaustive beam sweep cycle may be run at an interval of $T_{full}$ $T_{full}$ units of time, and each exhaustive beam sweep cycle lasts a duration of $t_{full}$. According to certain embodiments, the duration of an exhaustive beam sweep cycle, $t_{full}$, is greater than the duration of an optimized beam cycle, $t_{opt}$. The exhaustive beam sweep cycle duration, $t_{full}t_{full}$, depends on the number of beams. For example, the exhaustive beam sweep cycle duration, $t_{full}t_{full}$, may depend on the antenna array size. Additionally, in certain embodiments, the exhaustive beam sweep cycle interval period, $T_{full}T_{full}$, may be determined so that if wireless device 110 fails to detect a synchronization signal during an optimized beam sweep cycle, wireless device 110 can eventually detect a synchronization signal during a following exhaustive beam sweep cycle.

Figure 5:
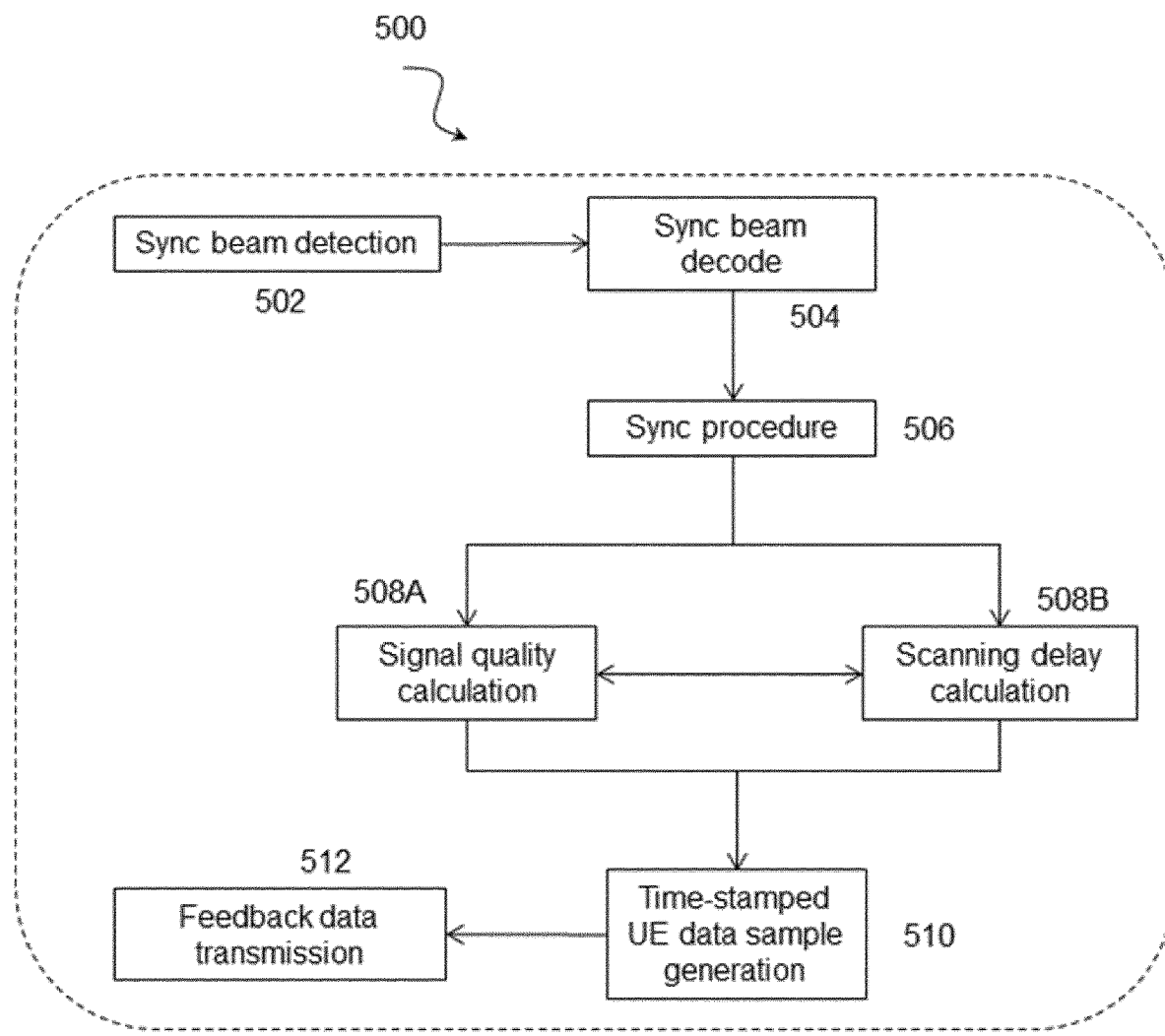
FIG. 5 illustrates an example method for adaptive initial synchronization beam sweep reception performed by a wireless device, according to certain embodiments.

FIG. 5 illustrates a method 500 for adaptive initial synchronization beam sweep reception performed by a wireless device, according to certain embodiments. More specifically, FIG. 5 illustrates the reception of a synchronization signal by an unsynchronized wireless device 110. At a step 502, a wireless device 110 searches for and detects a synchronization signal. At step 504, wireless device 110 decodes the synchronization signal. Thus, upon reception of at least one synchronization signal, the wireless device 110 decodes the information conveyed by the received synchronization signal. The decoded information may be used in a sync procedure at step 506. For example, wireless device 110 may perform synchronization in time and/or frequency.

In particular embodiments, wireless device 110 may calculate signal quality at step 508A. For example, wireless device 110 may calculate the corresponding per-beam received signal quality. Additionally or alternatively, wireless device 110 may perform a scanning delay calculation at step 508B. For example, wireless device 100 may calculate a scanning delay parameter $\tau_{scan}$ that corresponds to the time elapsed since wireless device 110 started searching for synchronization signals until wireless device 110 succeeds in synchronization.

At step 510, the calculated signal quality and/or $\tau_{scan}\tau_{scan}$ may be used to generate a time-stamped data sample. At step 512, feedback data may be transmitted to network node 115. Specifically, the time-stamped data sample may be reported to a network node 115 that transmitted the received synchronization signal.

In certain embodiments, the exhaustive beam sweep cycle may be partitioned into some pre-determined set of parts, the complete exhaustive beam sweep cycle being then interspersed with the optimized beam sweep cycles. In this case, a wireless device 110 that starts searching for synchronization within an exhaustive beam sweep cycle but could be covered by a beam from the optimized beam sweep instead does not wait too long until the next optimized beam sweep cycle. Each part of the exhaustive beam sweep cycle comprises the sweep over a subset of beam directions.

In certain embodiments, a synced wireless device delivers a time-stamped data sample using the physical uplink control channel (PUCCH). The time-stamped data sample may use some uplink resources for channel state information (CSI) reporting. The transmission of such a data sample may take place right after random access if it is considered somewhat a "critical" information. Otherwise, the transmission of such a data sample may take place only when the corresponding synchronized wireless device finds the best opportunity to report it. One potential situation where time-stamped wireless device data samples may be considered critical is when the amount of data samples available at network nodes 115 is still small. Then, any new sample would have a great impact on a subsequent beam parameter readjustment. Another critical situation may be when the corresponding synced wireless device 110 checks that the calculated scanning delay is too long. Then, the corresponding synced wireless device 110 may somehow prioritize the transmission of its time-stamped data sample because, again, such a data sample may have a greater impact on a subsequent beam parameter readjustment.

In certain embodiments, the method for adaptive initial synchronization beam sweep reception performed by a wireless device as described above may be performed by a virtual computing device. In certain embodiments, the virtual computing device may include modules for performing steps similar to those described above with regard to the method illustrated and described in FIG. 5. For example, the virtual computing device may include a detecting module for detecting the synchronization beam, a decoding module for decoding the synchronization beam, a performing module for performing a synchronization procedure, a calculation module for performing at least one of a signal quality calculation and a scanning delay calculation, a generation module 420 for generating a time-stamped UE data sample, a transmission module for transmitting feedback data, and any other suitable modules for adaptive initial synchronization beam sweep. In some embodiments, one or more of the modules may be implemented using one or more processors 320 or processing circuitry such as that described above with regard to FIG. 3.

In certain embodiments, the functions of two or more of the various modules may be combined into a single module. Additionally, the virtual computing device may include additional components beyond those discussed here that may be responsible for providing certain aspects of the wireless device's 110 functionality, including any of the functionality described above and/or any additional functionality (including any functionality necessary to support the solutions described above).

Figure 6:
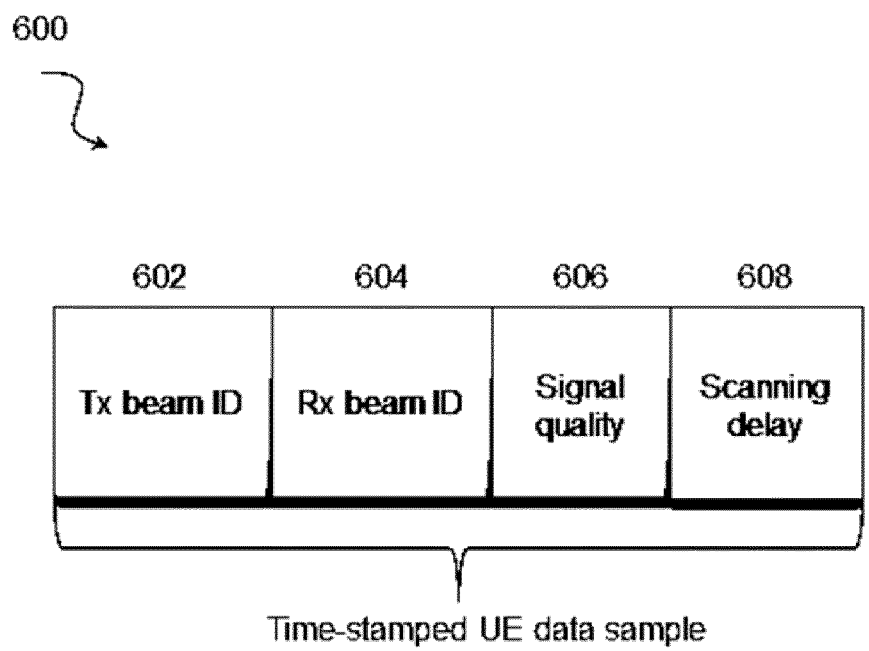
FIG. 6 illustrates an exemplary time-stamped UE data sample, in accordance with certain embodiments.

FIG. 6 illustrates an exemplary time-stamped data sample 600, according to certain embodiments. As depicted, the time-stamped data sample comprises: (i) information on spatial alignment during synchronization (i.e. the transmit beam direction 602 used by an AN to transmit the synchronization signal and the receive beam direction 604 used by the wireless device 110 to receive such a signal); (ii) per-beam received signal quality 606 measured during synchronization by wireless device 110; and (iii) the scanning delay, $\tau_{scan}$, $\tau_{scan}$ 608 measured during initial synchronization by wireless device 110.

Figure 7:
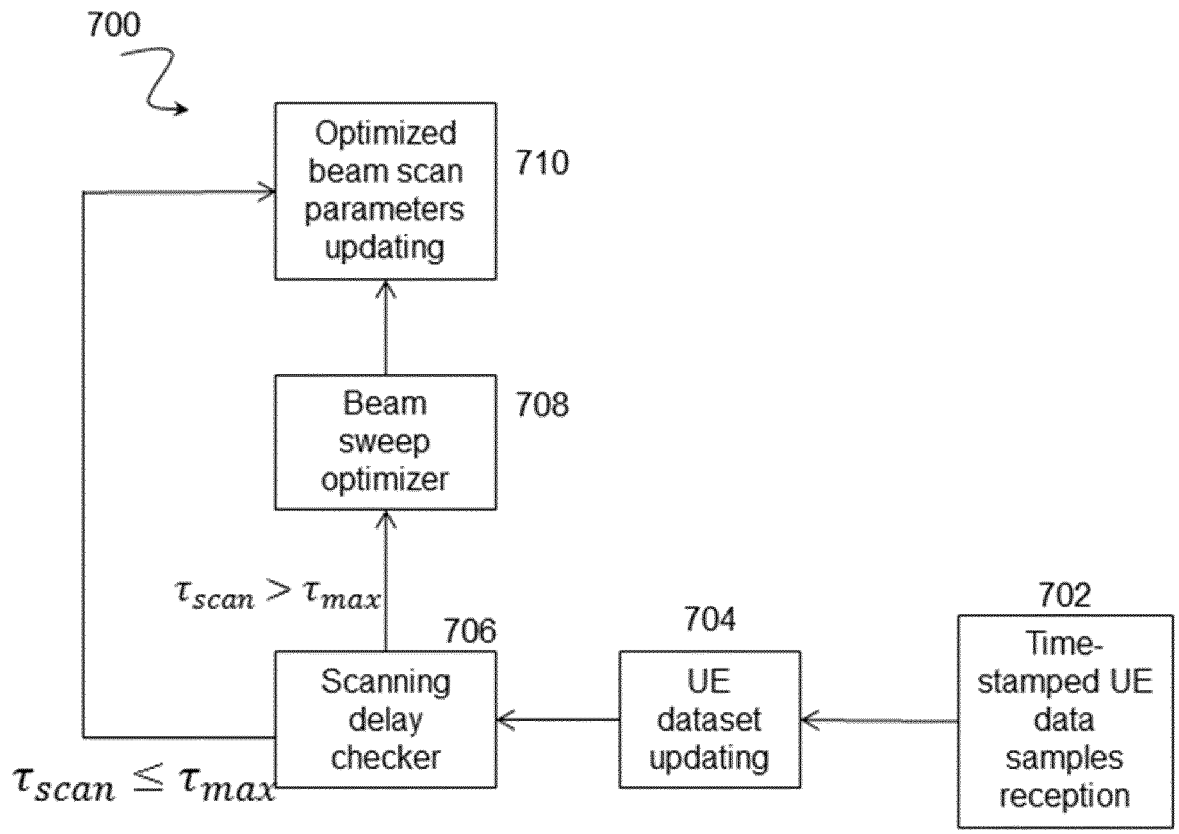
FIG. 7 illustrates an exemplary method for adaptive initial synchronization beam sweep transmission by a network node, in accordance with certain embodiments.

FIG. 7 illustrates a method 700 for adaptive initial synchronization beam sweep transmission performed by a network node 115, according to certain embodiments. More specifically, FIG. 7 illustrates the reception of time-stamped data samples from a synchronized wireless device 110. In certain embodiments, the information conveyed by the data report by the synchronized wireless device 110 may be used by the network node 115 to update some available set of historical statistics, which may be referred to as a dataset or UE dataset. The information may also be used to check how long the reporting wireless device 110 waited until it could synchronize.

The method may begin at step 702 when time-stamped data samples are received from a synchronized wireless device 110. Upon reception of such data samples, network node 115 updates the available set of historical statistics from the reported per-beam received synchronization signal quality at step 704.

At step 706, the reported scanning delay, $\tau_{scan}$, is compared with a maximum delay threshold, $\tau_{max}$, to determine whether the reporting wireless device 110 waited too long for synchronization. If at step 706 it is determined that the reported scanning delay, $\tau_{scan}$, is greater than the maximum delay threshold, $\tau_{max}$, ($\tau_{scan} > \tau_{max}$) network node 115 readjusts at least one parameter associated with the optimized beam sweep cycle at step 708. Conversely, if at step 706 it is determined that the reported scanning delay, $\tau_{scan}$, is less than or equal to the maximum delay threshold, $\tau_{max}\tau_{scan} \leq \tau_{max}$, ($\tau_{scan} \leq \tau_{max}$), the reported scanning delay, $\tau_{scan}$, is determined to be tolerable and network node 115 keeps using the same optimized beam sweep parameter setting.

In particular embodiments, the reported scanning delay, $\tau_{scan}$, may be used to adapt the parameter K. For example, the parameter K may be reduced if the reported scanning delay, $\tau_{scan}$, is too large. Alternatively, the reported scanning delay, $\tau_{scan}$, may be used to adapt the exhaustive beam sweep cycle interval period, $T_{full}T_{full}$. For example, the exhaustive beam sweep cycle interval period, $T_{full}$, may also or alternatively be reduced if the reported scanning delay, $\tau_{scan}$, is too large.

In other embodiments, the number of cycles K in a sequence of optimized beam sweep cycles may be adapted based on the readjustment of the optimized beam sweep parameters. For example, in certain embodiments, the number of cycles K may be increased if the resulting beam sweep pattern after the readjustment of the optimized beam sweep parameters is shorter.

In still other embodiments, the maximum delay threshold may be defined as follows:

$$\tau_{max} = t_{opt} + \tau_{margin}$$

where $\tau_{margin}$ stands for a pre-determined suitable margin. In this case, the time-stamped report from a wireless device 110 that cannot decode any synchronization signal during a complete optimized beam sweep cycle triggers the readjustment of the optimized beam sweep parameters.

In certain embodiments, the method for adaptive initial synchronization beam sweep performed a network node 115 as described above may be performed by a virtual computing device. In certain embodiments, the virtual computing device may include modules for performing steps similar to those described above with regard to the method illustrated and described in FIG. 7. For example, the virtual computing device may include a receiving module for receiving the time-stamped UE data sample(s), an updating module for updating a dataset from wireless device 110, a comparing module for comparing the reported scanning delay, $\tau_{scan}$, with a maximum delay threshold, $\tau_{max}\tau_{scan} \leq \tau_{max}$, an optimizing module for optimizing the beam sweep parameter K, an updating module for updating a wireless device 110 with the optimized beam sweep parameters decoding module for decoding the synchronization beam, and any other suitable modules for adaptive initial synchronization beam sweep. In some embodiments, one or more of the modules may be implemented using one or more processors 220 or processing circuitry such as that described above with regard to FIG. 2.

In certain embodiments, the functions of two or more of the various modules may be combined into a single module. Additionally, the virtual computing device may include additional components beyond those discussed here that may be responsible for providing certain aspects of the network node's 115 functionality, including any of the functionality described above and/or any additional functionality (including any functionality necessary to support the solutions described above).

Figure 8:
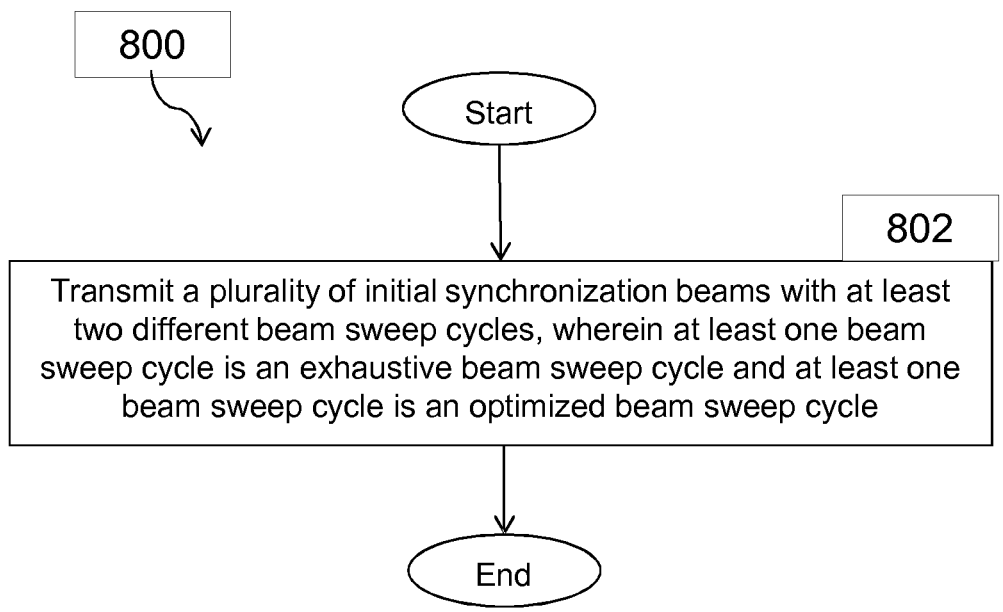
FIG. 8 illustrates another exemplary method for adaptive initial synchronization beam sweep transmission performed by network node, according to certain embodiments.

FIG. 8 illustrates another exemplary method 800 for adaptive initial synchronization beam sweep transmission performed by network node 115, according to certain embodiments. The method includes, at step 802, transmitting, by network node 115, a plurality of initial synchronization beams 400 with at least two different beam sweep cycles. According to certain embodiments, the at least two beam sweep cycles include at least one exhaustive beam sweep cycle 412 and at least one optimized beam sweep cycle 410. The exhaustive beam sweep cycle 412 covers all of a serving area of the cell served by network node 115. By contrast, the optimized beam sweep cycle 410 covers a subset of the serving area of the cell served by network node 115.

According to a particular embodiment, the exhaustive beam sweep cycle 412 may be partitioned into a plurality of parts. Each of the plurality of parts being associated with a respective subset of a plurality of beam directions. The plurality of parts may be interspersed between a plurality of optimized beam sweep cycles 410.

According to certain embodiments, the plurality of initial synchronization beams 400 include a number, K, of optimized beam sweep cycles 410 transmitted between two exhaustive beam sweep cycles 412. In a particular embodiment, each optimized beam sweep cycle 410 has a duration of $t_{opt}$ units of time and depends on the beam sweep pattern. Additionally or alternatively, the number, K, of optimized beam sweep cycles 410 may be determined based on the duration of $t_{opt}$ units of time, in a particular embodiment. Each exhaustive beam sweep cycle 412 may have a duration of $t_{full}$ that is greater than the duration of $t_{opt}$.

Though not depicted, according to certain embodiments, the method may further include the network node receiving time-stamped data 600 from a wireless device 110. In a particular embodiment, the time-stamped data 600 includes reported scanning delay, $\tau_{scan}$, that represents the time elapsed between when the wireless device 110 started searching for synchronization signals and when the wireless device 110 performed synchronization with the network node 115 based on at least one detected synchronization signal. Additionally or alternatively, the time-stamped data 600 may include information on spatial alignment during synchronization and/or a per-beam received signal quality measured during synchronization by the wireless. In a particular embodiment, the time-stamped data 600 may be received on a PUCCH. Additionally or alternatively, the time-stamped data 600 may be received on an uplink resource associated with CSI reporting.

In a particular embodiment, network node 115 may maintain a set of historical statistics for a synchronized wireless device 110. Upon receiving time-stamped data 600 from a wireless device 110, network node 115 may update the set of historical statistics. According to certain embodiments, the set of historical statistics may be used by network node 115 to determine and/or adjust at least one beam sweep parameter setting. For example, the exhaustive beam sweep cycle 412 may be run at an interval of units of time, $T_{full}$, that is selected based on the time-stamped data 600 received from a wireless device 110. As another example, network node 115 may determine that the reported scanning delay, $\tau_{scan}$, 608 is greater than a maximum delay threshold, $\tau_{max}\tau_{scan} \leq \tau_{max}$, ($\tau_{scan} \leq \tau_{max}$) and adjust at least one parameter associated with the optimized beam sweep cycle. Subsequently, an additional optimized beam sweep cycle 410 may be transmitted by network node 115 using, or according to, the adjusted at least one parameter. As another example, a beam sweep pattern may include a number of optimized beam sweep cycles 410, K, transmitted between two exhaustive beam sweep cycles 412, and network node 115 may adjust the at least one parameter, K, in response to determining that the reported scanning delay, $\tau_{scan}$, 608 is greater than a maximum delay threshold, $\tau_{max}\tau_{scan} \leq \tau_{max}$ ($\tau_{scan} \leq \tau_{max}$). In a particular embodiment where adjusting a parameter results in a shorter beam sweep pattern, network node 115 may increase the parameter K. As still another example, an exhaustive beam sweep cycle may be run at an interval of $T_{full}$ units of time, and adjusting the beam sweep parameters may include reducing $T_{full}$.

According to certain embodiments, the method described above may be carried out by a computer program or, a computer program product or a carrier containing a computer program, that includes instructions which, when executed on at least one processor, causes the at least one processor to carry out the above described method for adaptive initial synchronization beam sweep transmission.

Figure 9:
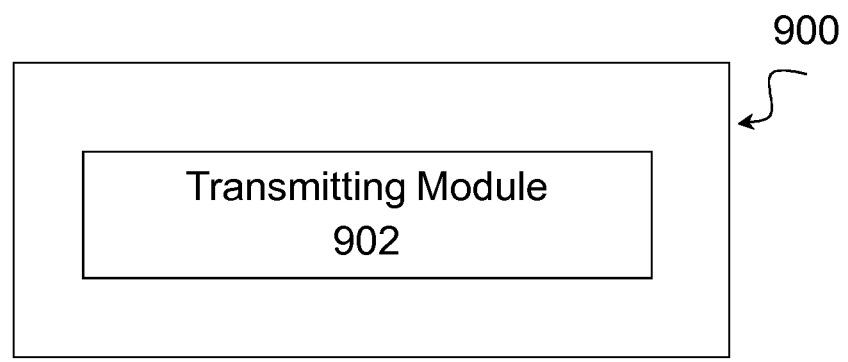
FIG. 9 illustrates an example virtual computing device for adaptive initial synchronization beam sweep transmission, according to certain embodiments.

In certain embodiments, the method for adaptive initial synchronization beam sweep as described above may be performed by a computer networking virtual apparatus. FIG. 9 illustrates an example virtual computing device 900 for adaptive initial synchronization beam sweep transmission, according to certain embodiments. In certain embodiments, virtual computing device 900 may include modules for performing steps similar to those described above with regard to the method illustrated and described in FIG. 8. For example, virtual computing device 900 may include at least one transmitting module 902 and any other suitable modules for adaptive initial synchronization beam sweep. In some embodiments, one or more of the modules may be implemented using one or more processors 220 of FIG. 2. In certain embodiments, the functions of two or more of the various modules may be combined into a single module.

The transmitting module 902 may perform the transmitting functions of virtual computing device 900. For example, in a particular embodiment, transmitting module 902 may transmit a plurality of initial synchronization beams 400 with at least two different beam sweep cycles. According to certain embodiments, the at least two beam sweep cycles include at least one exhaustive beam sweep cycle 412 and at least one optimized beam sweep cycle 410. The exhaustive beam sweep cycle 412 covers all of a serving area of the cell served by network node 115. By contrast, the optimized beam sweep cycle 410 covers a subset of the serving area of the cell served by network node 115.

Optionally, virtual computing device 900 may also include a receiving module that performs the receiving functions of virtual computing device 900. For example, in a particular embodiment, a receiving module may receive time-stamped data 600 from a wireless device 110.

Optionally, virtual computing device 900 may also include a storing module that performs the storing functions of virtual computing device 900. For example, in a particular embodiment, a storing module may store and maintain a set of historical statistics for a synchronized wireless device 110.

Optionally, virtual computing device 900 may additionally or alternatively include an updating module. The updating module may perform the updating functions of virtual computing devices. For example, in a particular embodiment, the updating module may update the set of historical statistics maintained for a wireless device 110 upon receiving time-stamped data 600 from wireless device 110.

Optionally, virtual computing device 900 may additionally or alternatively include an adjusting module. The adjusting module may perform the adjusting functions of virtual computing devices. For example, in a particular embodiment, the adjusting functions may adjust at least one beam sweep parameter setting in response to receiving time-stamped data 600 from wireless device 110.

Other embodiments of virtual computing device 900 may include additional components beyond those shown in FIG. 9 that may be responsible for providing certain aspects of the network node's 115 functionality, including any of the functionality described above and/or any additional functionality (including any functionality necessary to support the solutions described above). The various different types of network nodes 115 may include components having the same physical hardware but configured (e.g., via programming) to support different radio access technologies, or may represent partly or entirely different physical components.

Figure 10:
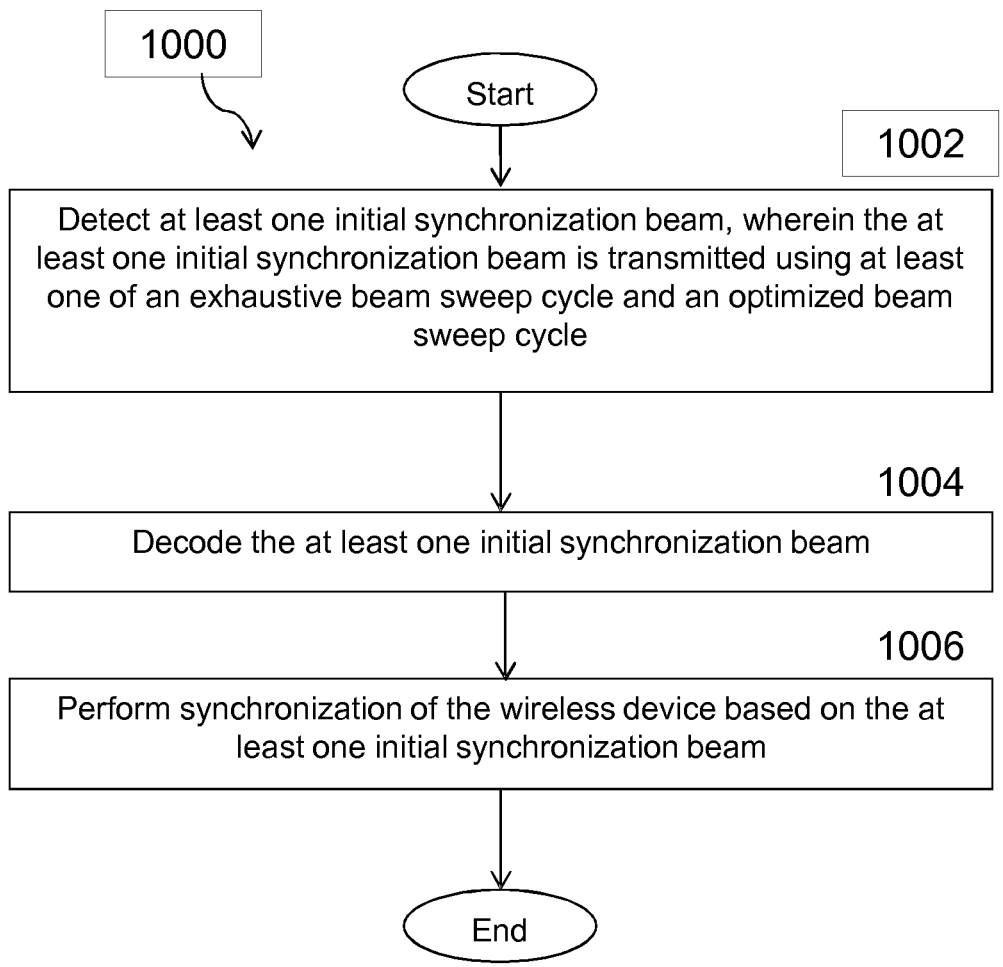
FIG. 10 illustrates another example method for adaptive initial synchronization beam sweep reception performed by a wireless device, according to certain embodiments.

FIG. 10 illustrates another example method 1000 for adaptive initial synchronization beam sweep reception performed by wireless device 110, according to certain embodiments. According to certain embodiments, the method 1000 begins at step 1002 when wireless device 110 detects at least one initial synchronization beam 400 having been transmitted by a network node 115 using at least one of an exhaustive beam sweep cycle 412 and an optimized beam sweep cycle 410. The exhaustive beam sweep cycle 412 covers a whole serving area of a cell served by network node 115. By contrast, the optimized beam sweep cycle 410 covers a subset of the whole serving area of the cell served by network node 115.

According to certain embodiments, the at least one initial synchronization beam 400 may include a number of K optimized beam sweep cycles 410 transmitted between two exhaustive beam sweep cycles 412. In a particular embodiment, the exhaustive beam sweep cycle 412 may be partitioned into a plurality of parts. The plurality of parts may be interspersed between a plurality of optimized beam sweep cycles 410, and each of the parts may be associated with a respective subset of a plurality of beam directions.

At step 1004, wireless device 110 decodes the at least one initial synchronization beam 400. Wireless device 110 then performs synchronization based on the decoded at least one initial synchronization beam at step 1006.

Though not depicted, wireless device 110 may also operate to transmit time-stamped data 600 to network node 115, according to certain embodiments. The time-stamped data 600 may include at least a scanning delay, $\tau_{scan}$, 608, in a particular embodiment. The scanning delay, $\tau_{scan}$, 608 may include a time elapsed between when wireless device 110 started searching for the initial synchronization beams and when wireless device 110 is synchronized based the at least one initial synchronization beam 400 detected by wireless device 110. According to a particular embodiment, the time-stamped data 600 may further include information on spatial alignment during synchronization and/or a per-beam received signal quality measured during synchronization by the wireless device 110. As described above, in a particular embodiment, the time-stamped data 600 may be transmitted on a PUCCH. In other embodiments, the time-stamped data 600 may be transmitted on an uplink resource associated with CSI reporting.

According to certain embodiments, prior to transmitting the time-stamped data 600, wireless device 110 may first determine whether the time-stamped data 600 includes critical information. If the time-stamped data 600 does not include critical information, wireless device 110 may transmit the time-stamped data 600 immediately after performing a random access procedure. Otherwise, where the time-stamped data 600 includes critical information, wireless device 110 may transmit the time-stamped data 600 during a next available reporting opportunity after performing a random access procedure. In a particular embodiment, the time-stamped data 600 may be determined to include critical information when an amount of time-stamped data samples previously transmitted from wireless device 110 is small and/or where scanning delay, $\tau_{scan}$, 608 has been determined to be too long.

According to certain embodiments, the method described above may be carried out by a computer program or, a computer program product or a carrier containing a computer program, that includes instructions which, when executed on at least one processor, causes the at least one processor to carry out the above described method for adaptive initial synchronization beam sweep reception.

Figure 11:
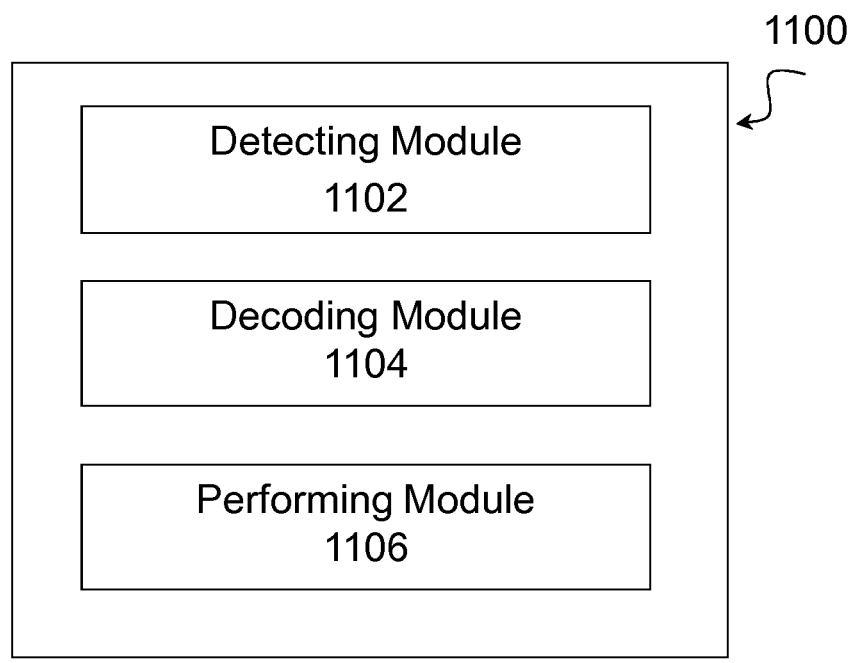
FIG. 11 illustrates another example virtual computing device for adaptive initial synchronization beam sweep reception, according to certain embodiments.

In certain embodiments, the method for adaptive initial synchronization beam sweep reception as described above may be performed by a computer networking virtual apparatus. FIG. 11 illustrates another example virtual computing device 1100 for adaptive initial synchronization beam sweep reception, according to certain embodiments. In certain embodiments, virtual computing device 1100 may include modules for performing steps similar to those described above with regard to the method illustrated and described in FIG. 10. For example, virtual computing device 1100 may include a detecting module 1102, a decoding module 1104, a performing module 1106, and any other suitable modules for adaptive initial synchronization beam sweep. In some embodiments, one or more of the modules may be implemented using one or more processors 320 of FIG. 3. In certain embodiments, the functions of two or more of the various modules may be combined into a single module.

The detecting module 1102 may perform the detecting functions of virtual computing device 1100. For example, in a particular embodiment, detecting module 1102 may detect at least one initial synchronization beam 400 transmitted by network node 115 using at least one of an exhaustive beam sweep cycle 412 and an optimized beam sweep cycle 410. The exhaustive beam sweep cycle 412 covers all of a serving area of the cell served by network node 115. By contrast, the optimized beam sweep cycle 410 covers a subset of the serving area of the cell served by network node 115.

The decoding module 1104 may perform the decoding functions of virtual computing device 1100. For example, in a particular embodiment, decoding module 1104 may decode the at least one initial synchronization beam.

The performing module 1106 may perform the performing functions of virtual computing device 1100. For example, in a particular embodiment, performing module 1106 may perform synchronization based on the at least one decoded initial synchronization beam.

Optionally, virtual computing device 1100 may also include at least one transmitting module that performs the transmitting functions of virtual computing device 1100. For example, in a particular embodiment, a transmitting module may transmit time-stamped data 600 to network node 115. The time-stamped data 600 may include at least a scanning delay, $\tau_{scan}$, 608, in a particular embodiment. According to a particular embodiment, the time-stamped data 600 may further include information on spatial alignment during synchronization and/or a per-beam received signal quality measured during synchronization by the wireless device 110.

Optionally, virtual computing device 1100 may also include at least one determining module that performs the determining functions of virtual computing device 900. For example, in a particular embodiment, a determining module may determine whether the time-stamped data 600 includes critical information. If the time-stamped data 600 does not include critical information, the determining module and/or the transmitting module may transmit the time-stamped data 600 immediately after performing a random access procedure. Otherwise, where the time-stamped data 600 includes critical information, the determining module and/or transmitting module may transmit the time-stamped data 600 during a next available reporting opportunity after performing a random access procedure.

Other embodiments of virtual computing device 1100 may include additional components beyond those shown in FIG. 11 that may be responsible for providing certain aspects of the wireless device's 110 functionality, including any of the functionality described above and/or any additional functionality (including any functionality necessary to support the solutions described above). The various different types of wireless device 110 may include components having the same physical hardware but configured (e.g., via programming) to support different radio access technologies, or may represent partly or entirely different physical components.

According to certain embodiments, a method in a network node is provided for adaptive initial synchronization beam sweep transmission. The method includes transmitting a plurality of initial synchronization beams with at least two different beam sweep cycles. At least one beam sweep cycle is an exhaustive beam sweep cycle and at least one beam sweep cycle is an optimized beam sweep cycle. The exhaustive beam sweep cycle covers all of a serving area of the cell and the optimized beam sweep cycle covers a subset of the serving area.

According to certain embodiments, a network node is provided for adaptive initial synchronization beam sweep transmission. The network node controls a serving area of a cell and includes a memory storing instructions and processing circuitry. The processing circuitry is configured to execute the instructions to cause the processing circuitry to transmit a plurality of initial synchronization beams with at least two different beam sweep cycles. At least one beam sweep cycle is an exhaustive beam sweep cycle, and at least one beam sweep cycle is an optimized beam sweep cycle. The exhaustive beam sweep cycle covers all of a serving area of the cell and the optimized beam sweep cycle covers a subset of the serving area.

According to certain embodiments, a method in a wireless device is provided for adaptive initial synchronization beam sweep reception. The method includes detecting at least one initial synchronization beam that is transmitted using at least one of an exhaustive beam sweep cycle covering a whole serving area of a cell and an optimized beam sweep cycle covering a subset of the whole serving area of the cell. The at least one initial synchronization beam is decoded and synchronization of the wireless device is performed based on the at least one decoded initial synchronization beam.

According to certain embodiments, a wireless device is provided for adaptive initial synchronization beam reception. The wireless device includes a memory storing instructions and processing circuitry. The processing circuitry is configured to execute the instructions to cause the processing circuitry to detect at least one initial synchronization beam transmitted using at least one of an exhaustive beam sweep cycle covering a whole serving area of a cell and an optimized beam sweep cycle covering a subset of the whole serving area of the cell. The at least one initial synchronization beam is decoded and synchronization of the wireless device is performed based on the at least one decoded initial synchronization beam.

According to certain embodiments, a computer program or, a computer program product or a carrier containing a computer program, comprising instructions which, when executed on at least one processor, causes the at least one processor to carry out a method for adaptive initial synchronization beam sweep transmission. The method includes transmitting a plurality of initial synchronization beams with at least two different beam sweep cycles. At least one beam sweep cycle is an exhaustive beam sweep cycle and at least one beam sweep cycle is an optimized beam sweep cycle. The exhaustive beam sweep cycle covers all of a serving area of the cell and the optimized beam sweep cycle covers a subset of the serving area.

According to certain embodiments, a method by a wireless device is provided for adaptive initial synchronization beam sweep. The method includes
  detecting a synchronization beam;
  decoding the synchronization beam;
  performing a synchronization procedure;
  performing a calculation comprising at least one of a signal quality calculation and a scanning delay calculation;
  generating a time-stamped UE data sample based on the calculation comprising at least one of the signal quality calculation and the scanning delay calculation; and
  transmitting feedback data to a network node;
  optionally, performing the synchronization procedure comprise synchronizing in at least one of time and frequency;
  optionally, the time-stamped UE data sample comprises at least one of:
    information on spatial alignment during synchronization;
    transmit direction used by the network node to transmit the synchronization beam;
    receive beam direction used by the wireless device to receive the synchronization beam;
    per-beam received signal quality measured during synchronization by the wireless device; and
    the scanning delay measured during initial synchronization by the wireless device.

According to certain embodiments, a wireless device is provided for adaptive initial synchronization beam sweep. The wireless device comprises
  a memory storing instructions; and
  a processor configured to execute the instructions to cause the wireless device to:
    detect a synchronization beam;
    decode the synchronization beam;
    perform a synchronization procedure;
    perform a calculation comprising at least one of a signal quality calculation and a scanning delay calculation;
    generate a time-stamped UE data sample based on the calculation comprising at least one of the signal quality calculation and the scanning delay calculation; and
    transmit feedback data to a network node;
  optionally, performing the synchronization procedure comprise synchronizing in at least one of time and frequency;
  optionally, the time-stamped UE data sample comprises at least one of:
    information on spatial alignment during synchronization;
    transmit direction used by the network node to transmit the synchronization beam;
    receive beam direction used by the wireless device to receive the synchronization beam;
    per-beam received signal quality measured during synchronization by the wireless device; and
    the scanning delay measured during initial synchronization by the wireless device;

According to certain embodiments, a method by a network node is provided for adaptive initial synchronization beam sweep. The method includes:
  receiving a time-stamped UE data sample;
  updating a UE dataset based on the time-stamped UE data sample;
  comparing the scanning delay to a delay threshold;
  determining whether to optimize beam sweep parameters based on the comparison of the scanning delay to the delay threshold;
  optionally, the beam sweep parameters are optimized if the scanning delay is greater than the delay threshold;
  optionally, the beam sweep parameters are not optimized if the scanning delay is not greater than the delay threshold;
  optionally, the time-stamped UE data sample comprises at least one of:
    information on spatial alignment during synchronization;
    transmit direction used by the network node to transmit the synchronization beam;
    receive beam direction used by the wireless device to receive the synchronization beam;
    per-beam received signal quality measured during synchronization by the wireless device; and
    the scanning delay measured during initial synchronization by the wireless device.

According to certain embodiments, a network node is provided for adaptive initial synchronization beam sweep. The network node comprises:
  a memory storing instructions; and
  a processor configured to execute the instructions to cause the wireless device to:
    receive a time-stamped UE data sample;
    update a UE dataset based on the time-stamped UE data sample;
    compare the scanning delay to a delay threshold;
    determine whether to optimize beam sweep parameters based on the comparison of the scanning delay to the delay threshold;
    optionally, the beam sweep parameters are optimized if the scanning delay is greater than the delay threshold;
    optionally, the beam sweep parameters are not optimized if the scanning delay is not greater than the delay threshold;
    optionally, the time-stamped UE data sample comprises at least one of:
      information on spatial alignment during synchronization;
      transmit direction used by the network node to transmit the synchronization beam;
      receive beam direction used by the wireless device to receive the synchronization beam;
      per-beam received signal quality measured during synchronization by the wireless device; and
      the scanning delay measured during initial synchronization by the wireless device.

Certain embodiments of the present disclosure may provide one or more technical advantages. For example, certain embodiments may combine both exhaustive beam sweep and optimized beam sweep and allow for dynamic readjustment of beam sweep parameters. Another advantage may be that the optimized beam sweep cycles may allow access nodes (ANs) to rely on up-to-date historical statistics whenever the ANs need to determine new optimized beam sweep parameters. As result, the disclosed techniques may reduce the misdetection probability of unsynchronized UEs. Still another advantage may be that the disclosed techniques decrease scanning delay. Still another technical advantage may be that the set of historical statistics are improved by adding information on scanning delay, which allows ANs to optimize the beam sweep parameters subject to delay constraints.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
eNB evolved NodeB, base station
UE User Equipment or User Device
5G Fifth Generation
AN Access Node
LTE Long-term Evolution
PUCCH Physical Uplink Control Channel

The invention claimed is:

1. A method in a network node for adaptive initial synchronization beam sweep transmission, the network node controlling a serving area of a cell, the method comprising:
transmitting a plurality of initial synchronization beams with at least two different beam sweep cycles, wherein at least one beam sweep cycle is an exhaustive beam sweep cycle and at least one beam sweep cycle is an optimized beam sweep cycle, wherein the exhaustive beam sweep cycle covers all of a serving area of the cell and the optimized beam sweep cycle covers a subset of the serving area, wherein the plurality of initial synchronization beams comprise a number of K optimized beam sweep cycles transmitted between two exhaustive beam sweep cycles.

2. The method of claim 1, wherein:
each optimized beam sweep cycle has a duration of $t_{opt}$ units of time, and depends on the beam sweep pattern, and the number of K optimized beam sweep cycles is determined based on the duration of $t_{opt}$ units of time; or,
each optimized beam sweep cycle has a duration of $t_{opt}$ units of time, and
each exhaustive beam sweep cycle has a duration of $t_{full}$ that is greater than the duration of $t_{opt}$.

3. The method of claim 1, further comprising:
receiving time-stamped data from a wireless device, wherein the exhaustive beam sweep cycle is run at an interval of $T_{full}$ units of time that is selected based on the time-stamped data received from a wireless device.

4. The method of claim 3, wherein:
the time-stamped data is received on a physical uplink control channel, PUCCH; or
the time-stamped data is received on an uplink resource associated with, channel state information, CSI, reporting.

5. The method of claim 3, wherein;
the time-stamped data received from the wireless device comprises a scanning delay, the scanning delay comprising a time elapsed between when the wireless device started searching for synchronization signals and when the wireless device synchronized; or
the time-stamped data received from the wireless device comprises a scanning delay, the scanning delay comprising a time elapsed between when the wireless device started searching for synchronization signals and when the wireless device synchronized, and determining that the scanning delay is greater than a maximum delay threshold; and
in response to determining that the scanning delay is greater than the maximum delay threshold, adjusting at least one parameter associated with the optimized beam sweep cycle; and
transmitting an additional optimized beam sweep cycle according to the adjusted at least one parameter; or
transmitting an additional optimized beam sweep cycle according to the adjusted at least one parameter, wherein the at least one parameter comprises a number of optimized beam sweep cycles, K, transmitted between two exhaustive beam sweep cycles; and adjusting the at least one parameter comprises reducing K; or
transmitting an additional optimized beam sweep cycle according to the adjusted at least one parameter, wherein the at least one parameter comprises $T_{full}$; and adjusting the at least one parameter comprises reducing $T_{full}$, or,
transmitting an additional optimized beam sweep cycle according to the adjusted at least one parameter, wherein adjusting the at least one parameter results in a shorter beam sweep pattern, comprising:
increasing a number of optimized beam sweep cycles K, transmitted between a first exhaustive beam sweep cycle and a second exhaustive beam sweep cycle; or,
transmitting an additional optimized beam sweep cycle according to the adjusted at least one parameter wherein each optimized beam sweep cycle has a duration of $t_{opt}$ units of time and the maximum delay threshold is equal to $t_{opt}+t_{margin}$, where $t_{margin}$ comprises a predetermined suitable margin.

6. The method of claim 1, wherein the time-stamped data received from the wireless device further comprises at least one of:
information on spatial alignment during synchronization; and
a per-beam received signal quality measured during synchronization by the wireless device.

7. The method of claim 1, further comprising:
maintaining a set of historical statistics for a synchronized wireless device;

using the set of historical statistics to determine at least one beam sweep parameter setting;

in response to receiving time-stamped data from a wireless device, updating the set of historical statistics based on the time-stamped data received from the wireless device and/or wherein the exhaustive beam sweep cycle is partitioned into a plurality of parts, the plurality of parts being interspersed between a plurality of optimized beam sweep cycles, each of the plurality of parts being associated with a respective subset of a plurality of beam directions.

8. A network node for adaptive initial synchronization beam sweep transmission, the network node controlling a serving area of a cell, the network node comprising:

a memory storing instructions; and processing circuitry configured to execute the instructions to cause the processing circuitry to:

transmit a plurality of initial synchronization beams with at least two different beam sweep cycles, wherein at least one beam sweep cycle is an exhaustive beam sweep cycle and at least one beam sweep cycle is an optimized beam sweep cycle, wherein the exhaustive beam sweep cycle covers all of a serving area of the cell and the optimized beam sweep cycle covers a subset of the serving area wherein the plurality of initial synchronization beams comprise a number of K optimized beam sweep cycles transmitted between two exhaustive beam sweep cycles.

9. The network node of claim 8, wherein the processing circuitry is further configured to execute the instructions to cause the processing circuitry to:

receive time-stamped data from a wireless device, wherein the exhaustive beam sweep cycle is run at an interval of $T_{full}$ units of time that is selected based on the time-stamped data received from a wireless device; or receive time-stamped data from a wireless device, wherein the exhaustive beam sweep cycle is run at an interval of $T_{full}$ units of time that is selected based on the time-stamped data received from a wireless device and wherein the time-stamped data received from the wireless device comprises a scanning delay, the scanning delay comprising a time elapsed between when the wireless device started searching for synchronization signals and when the wireless device synchronized; or:

receive time-stamped data from a wireless device, wherein the exhaustive beam sweep cycle is run at an interval of $T_{full}$ units of time that is selected based on the time-stamped data received from a wireless device, and wherein the time-stamped data received from the wireless device comprises a scanning delay, the scanning delay comprising a time elapsed between when the wireless device started searching for synchronization signals and when the wireless device synchronized; and determine that the scanning delay is greater than a maximum delay threshold; and in response to determining that the scanning delay is greater than the maximum delay threshold, adjust at least one parameter associated with the optimized beam sweep cycle; and transmit the additional optimized beam sweep cycle according to the adjusted at least one parameter.

10. The network node of claim 8, wherein the processing circuitry is further configured to execute the instructions to cause the processing circuitry to:

maintain a set of historical statistics for a synchronized wireless device;

use the set of historical statistics to determine at least one beam sweep parameter setting;

in response to receiving time-stamped data from a wireless device, update the set of historical statistics based on the time-stamped data received from the wireless device.

11. A method in a wireless device for adaptive initial synchronization beam sweep reception, the method comprising:

detecting at least one initial synchronization beam, wherein the at least one initial synchronization beam is transmitted using:

an exhaustive beam sweep cycle covering a whole serving area of a cell, and an optimized beam sweep cycle covering a subset of the whole serving area of the cell, wherein the at least one initial synchronization beam comprise a number of K optimized beam sweep cycles transmitted between two exhaustive beam sweep cycles;

decoding the at least one initial synchronization beam; and performing the synchronization of the wireless device based on the at least one decoded initial synchronization beam.

12. The method of claim 11, further comprising transmitting time-stamped data to a network node, wherein:

the time-stamped data comprising at least a scanning delay, the scanning delay comprising a time elapsed between when the wireless device started searching for the at least one initial synchronization beam and when the wireless device synchronized based the at least one of the initial synchronization beam; or the time-stamped data comprising at least a scanning delay, the scanning delay comprising a time elapsed between when the wireless device started searching for the at least one initial synchronization beam and when the wireless device synchronized based the at least one of the initial synchronization beam, and the time-stamped data is transmitted on:

a physical uplink control channel, PUCCH; or an uplink resource associated with channel state information, CSI, reporting; or determining whether the time-stamped data includes critical information; and if the time-stamped data does not include critical information, transmitting the time-stamped data immediately after performing a random access procedure; or if the time-stamped data includes critical information, transmitting the time-stamped data during a next available reporting opportunity after performing a random access procedure.

13. The method of claim 12, wherein the time-stamped data:

includes critical information when an amount of time-stamped data samples previously transmitted from the wireless device is small; or includes critical information when the scanning delay is too long; or further comprises at least one of:

information on spatial alignment during synchronization; and a per-beam received signal quality measured during synchronization by the wireless device.

14. The method of claim 11 wherein the exhaustive beam sweep cycle is partitioned into a plurality of parts, the plurality of parts being interspersed between a plurality of optimized beam sweep cycles, each of the plurality of parts being associated with a respective subset of a plurality of beam directions.

15. A wireless device for adaptive initial synchronization beam sweep reception, the wireless device comprising:
   a memory storing instructions; and
      processing circuitry configured to execute the instructions to cause the processing circuitry to:
         detect at least one initial synchronization beam, wherein the at least one initial synchronization beam is transmitted using:
            an exhaustive beam sweep cycle covering a whole serving area of a cell, and
            an optimized beam sweep cycle covering a subset of the whole serving area of the cell, wherein the at least one initial synchronization beam comprise a number of K optimized beam sweep cycles transmitted between two exhaustive beam sweep cycles;
         decode the at least one initial synchronization beam; and
         perform synchronization of the wireless device based on the at least one of the decoded initial synchronization beam.

16. The wireless device of claim 15, wherein the processing circuitry is further configured to execute the instructions to cause the processing circuitry to:
   transmit time-stamped data to a network node, the time-stamped data comprising at least a scanning delay, the scanning delay comprising a time elapsed between when the wireless device started searching for the at least one initial synchronization beam and when the wireless device synchronized based on the at least one initial synchronization beam or:
   determine whether the time-stamped data includes critical information; and
      if the time-stamped data does not include critical information, transmit the time-stamped data immediately after performing a random access procedure; or
      if the time-stamped data includes critical information, transmit the time-stamped data during a next available reporting opportunity after performing a random access procedure.

* * * * *